US012567831B2

(12) United States Patent
Agarwal et al.

(10) Patent No.:  US 12,567,831 B2
(45) Date of Patent:  Mar. 3, 2026

(54) ENERGY HARVESTING COMPONENT FOR AN OPTICAL DEVICE HAVING AN ILLUMINATION SOURCE EMITTING UNUSED LIGHT

(71) Applicant: Meta Platforms Technologies, LLC, Menlo Park, CA (US)

(72) Inventors: Rahul Agarwal, Woodinville, WA (US); Jonathan Robert Peterson, Woodinville, WA (US); Christopher Yuan Ting Liao, Seattle, WA (US); Giuseppe Calafiore, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 276 days.

(21) Appl. No.: 18/133,269

(22) Filed: Apr. 11, 2023

(65) Prior Publication Data

US 2024/0348201 A1      Oct. 17, 2024

(51) Int. Cl.
| | |
|---|---|
| *H02S 40/22* | (2014.01) |
| *G02B 5/22* | (2006.01) |
| *G02B 5/30* | (2006.01) |
| *G02B 6/12* | (2006.01) |
| *G02F 1/133* | (2006.01) |

(52) U.S. Cl.
CPC ............... *H02S 40/22* (2014.12); *G02B 5/22* (2013.01); *G02B 5/3025* (2013.01); *G02B 6/12* (2013.01); *G02F 1/13324* (2021.01)

(58) Field of Classification Search
CPC ....... H02S 40/22; G02F 1/13324; G02B 5/22; G02B 5/3025; G02B 6/12
See application file for complete search history.

(56) References Cited

U.S. PATENT DOCUMENTS

| | | | |
|---|---|---|---|
| 8,130,440 B2 | 3/2012 | Kothari et al. | |
| 8,294,858 B2 | 10/2012 | Limketkai et al. | |
| 9,472,602 B2 | 10/2016 | Xu et al. | |
| 10,403,774 B2 | 9/2019 | Barr et al. | |
| 2009/0103161 A1* | 4/2009 | Kothari ................. | H10K 59/60 |
| | | | 359/245 |
| 2022/0350100 A1* | 11/2022 | Peterson ................ | G06F 3/011 |

OTHER PUBLICATIONS

Meynard B., et al., "SiN Photonic Integrated Circuit Designed to Evaluate Its Interaction with a Hologram for an Augmented Reality Application," Proceedings of SPIE, Apr. 2, 2020, vol. 11364, 10 pages.

* cited by examiner

*Primary Examiner* — Nathanael R Briggs
(74) *Attorney, Agent, or Firm* — Greenburg Traurig, LLP

(57)      ABSTRACT
According to examples, an energy harvesting component for an optical device having an illumination source emitting unused light is described. The apparatus may include a light source to generate and transmit display light comprising at least one beam of light and an illumination source component to receive the at least one beam of light and to diffract the at least one beam of light in a first direction and an opposing direction. The apparatus may further include and an energy harvesting component to receive and absorb the at least one beam of light diffracted in an opposing direction and to convert the at least one beam of light diffracted in an opposing direction into electrical energy.

9 Claims, 15 Drawing Sheets

TEMPLE
306

300

FRAME
305

TEMPLE
306

DISPLAY
310

810

811

812

813

812a

910

911

913a-b 912a-b

1000

Provide a photonic integrated circuit (PIC)
1010

Couple an interconnect layer to the photonic integrated circuit (PIC)
1020

Couple an energy harvesting component to the interconnect layer
1030

ENERGY HARVESTING COMPONENT FOR AN OPTICAL DEVICE HAVING AN ILLUMINATION SOURCE EMITTING UNUSED LIGHT

TECHNICAL FIELD

This patent application relates generally to display technologies, and more specifically, to providing an energy harvesting component for an optical device having an illumination source emitting unused light.

BACKGROUND

Augmented reality (AR), virtual reality (VR), and mixed reality (MR) are modern technologies with potential for significant impact(s) on humanity. Various digital displays, such as a smart glasses, may provide augmented reality (AR), virtual reality (VR), and mixed reality (MR) experiences to a user.

In some instances, smart glasses may include one or more photonic integrated circuits (PICs). In some instances, the photonic integrated circuit (PIC) may include one or more gratings that may direct display light in a desired direction (e.g., towards a viewing user's eye).

Typically, a grating in a photonic integrated circuit (PIC) may diffract incoming light and emit the light both in a first direction (e.g., towards a viewing user's eyes) and in a second direction opposite to the first direction (e.g., towards the outer world or "world-side"). As such, in many instances, while the light emitted the first direction may be useful, the light emitted in the opposing direction may not be useful and may lead to unnecessary energy consumption.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
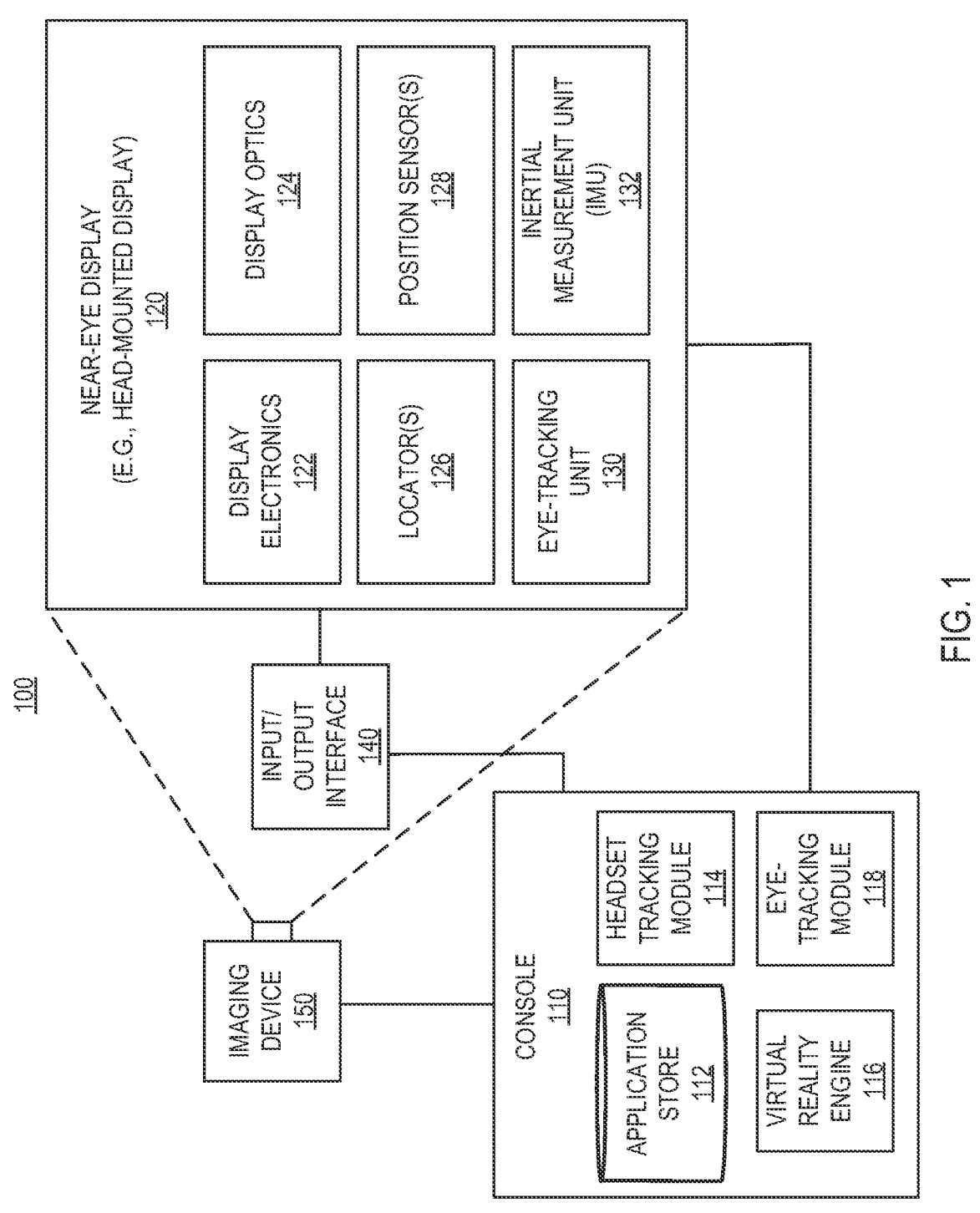
FIG. 1 illustrates a block diagram of an artificial reality system environment including a near-eye display device, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Augmented reality (AR), virtual reality (VR), and mixed reality (MR) are modern technologies with potential for significant impact(s) on humanity. Various digital displays, such as a smart glasses, may provide augmented reality (AR), virtual reality (VR), and mixed reality (MR) experiences to a user.

In some examples, a smart glass may include one or more photonic integrated circuits (PICs). As used herein, a "photonic integrated circuit (PIC)" may include any integrated optical circuit including a plurality of photonic components.

In some instances, the photonic integrated circuit (PIC) may be used to, among other things, detect, generate, transport, and/or process optical signals. So, in some examples, the photonic integrated circuit (PIC) may be utilized to provide display light for users of a display device. In other examples, the photonic integrated circuit (PIC) may be utilized to enable various optical sensor technologies (e.g., in a wearable device). In some examples, the photonic integrated circuit (PIC) may be transparent (e.g., to enable transmission towards a viewing user's eye).

In some examples, a photonic integrated circuit (PIC) may receive one or more light beams from a light source. In some examples, a light source may be a laser or laser diode, a light emitting diode (LED), or the like. As used herein, a "laser" may include any device that may emit light through a process of optical amplification based on a stimulated emission of light. In some examples, a (input source) laser may direct of one or more wavelengths (e.g., red, green, blue, etc.) towards an illumination source component, such as a photonic integrated circuit (PIC).

A photonic integrated circuit (PIC) may utilize one or more gratings. In some examples, the one or more gratings may be utilized to direct an optical signal from a first location to a second location and in a desired direction. For example, in some instances, the one or more gratings may be utilized to direct light from a projector located on display device (e.g., a head-mounted display (HMD)) towards a user's eye.

Typically, in a photonic integrated circuit (PIC), a grating may emit light in two directions. In particular, a grating in a photonic integrated circuit (PIC) may diffract incoming light and emit the light both in a first direction (e.g., towards a viewing user's eyes) and in a second direction different than (e.g., opposite to) the first direction (e.g., towards the outer world or "world-side"). In some instances, the second direction opposite to the first direction may also be referred to as the "opposing" direction. In some instances, the grating may be referred to as a "diffraction-based" grating.

In some examples, a diffraction-based grating may emit diffracted light in a first direction and an opposing direction equally or substantially equally. In other examples, the amount of light emitted towards the first direction and the opposing direction may not be equal.

In many instances, such as those related to optical devices, light emitted by a diffraction-based grating in a first direction may be useful (e.g., light emitted towards a viewing user's eyes), but light emitted by the diffraction-based grating in an opposing direction may not be useful. In some instances, the light emitted in the opposing direction may be referred to as "unused light." As used herein, "unused" light may include any light that may be propagated by a grating or waveguide configuration in a direction that is away from a viewing user's eyes (e.g., "world-side").

For example, in some instances, a broadband light source (e.g., located in a head-mounted device (HMD)) may project excessive light, which may then be (partly) projected by the diffraction-based grating in an opposing direction. It may further be appreciated that this unused light directed in the opposing direction may result in unnecessary energy consumption.

Also, in some examples, unused light (e.g., light emitted in an opposing direction) may heat up display device components, which may cause the components to function sub-optimally. In addition, in some instances, unused light may reduce image quality or inhibit proper viewing by a user by producing undesirable additions to a displayed image (e.g., artifacts, haze, ghost images due to crosstalk, etc.).

The systems and methods described herein may provide an optical system (e.g., a virtual reality (VR)-based head-mounted device (HMD) or eyewear) or device including at least one energy harvesting component for harvesting light (e.g., light emitted from an optical source) to provide increased energy efficiency and image clarity. In some examples, the systems and methods may provide the energy harvesting component for an optical device having an illumination source component emitting unused light. In some examples, and as discussed further below, a "energy harvesting component", as described herein, may include any component or device associated with an optical system or component that may, among other things, receive optical energy and convert the received optical energy into electrical energy.

As used herein, an "illumination source" or "illumination source component" may include any device or component that may provide, propagate or receive light. Examples include, but are not limited to, photonic integrated circuits (PICs), light emitting diodes (LEDs), laser diodes, beam shapers, and the like. It may be appreciated that, as will be discussed in further detail below, the systems and methods described may be utilized in conjunction with any such illumination source or that may emit light in an opposing direction (e.g., away from a viewing user's eyes).

In some examples and as discussed further below, the energy harvesting component may receive, convert, and/or utilize light (e.g., emitted by a projector on a virtual reality (VR)-based headset). As discussed above, in some instances, an optical component, such as a photonic integrated circuit (PIC) including a diffraction-based grating, may emit light in a first direction (e.g., towards a user's eye) and an opposing direction (e.g., away from a user's eye or "world-side"). In some instances, the light emitted toward the opposing direction may be unused, and therefore may represent unnecessary energy consumption. In some examples, an optical system or component including an energy harvesting component may enable greater energy efficiency by converting this unused light to electrical energy for use in association with the optical system or component.

In some examples, the energy harvesting component may be a photovoltaic (PV) cell. As used herein, a "photovoltaic cell" may include any electrical device that may convert optical energy into electrical energy. In some examples, systems and methods may provide a photovoltaic (PV) cell to capture unused light and convert the unused light into electrical energy. In some examples, the photovoltaic (PV) cell may convert light into electrical energy by absorbing the light and exciting valence band electrons into a conduction band. In some examples, the photovoltaic (PV) cell may then generate an electrical current using the excited electrons by separating an electron-hole pair and generating electrical potential. Accordingly, in some examples, the photovoltaic (PV) cell may be located to enable efficient absorption of light (e.g., unused light) emitted from a photonic integrated circuit (PIC).

In some examples, a photovoltaic (PV) cell may absorb a variety of wavelength ranges (e.g., a "broad-spectrum" photovoltaic (PV) cell). In particular, in some examples and as will be discussed further below, a broad-spectrum photovoltaic (PV) cell may utilize various wavelength ranges of visible light, including red, green, and blue (RGB) light, that may be emitted from a light source (e.g., laser).

In some examples, a photovoltaic (PV) cell may include one or more layers. In some examples, the one or more layers may be opaque, in that they may be provided to absorb light.

Also, as discussed in further detail below, in some examples, one or more layers of a photovoltaic (PV) cell may enable device efficiency by collecting and absorbing optical energy emitted from a photonic integrated circuit (PIC). In particular, in some examples, the photovoltaic (PV) may include a first layer that may be directed to a first wavelength range of emitted light, and may further include a second layer that may be directed to a second wavelength range of the emitted light. In particular, in one example, the first layer may be directed to absorption of the a higher-energy portion of a wavelength spectrum (e.g., blue and green light), whereas a second layer may be directed to absorption of a lower-energy portion of the wavelength spectrum (e.g., red light). In some examples, layers of the photovoltaic (PV) cell may be provided to enable a portion of the wavelength spectrum (e.g., the lower-energy portion of the wavelength spectrum) to pass through the first layer and then be absorbed by the second layer.

In some examples, a photovoltaic (PV) cell may be implemented to convert, generate, and/or store electrical energy for various purposes. So, in some examples, the photovoltaic (PV) cell may be utilized provide electrical energy to power one or more circuits of an associated optical device or component (e.g., a photonic integrated circuit (PIC) associated with a backlight of a display device). In other examples, the photovoltaic cell may provide converted electrical energy to be stored in a battery device.

Also, as discussed above, unused light may reduce image quality (e.g., by creating optical artifacts) or inhibit proper viewing by a user. In some examples, an energy harvesting component as provided herein may enhance image quality by eliminating excess light and projecting light that may be associated with a displayed image for viewing by a user.

In some examples, the systems and methods described may include a display system, comprising a light source to generate and transmit display light, the display light comprising at least one beam of light; an illumination source component to receive the at least one beam of light and to diffract the at least one beam of light in a first direction and an opposing direction; and an energy harvesting component to receive and absorb the at least one beam of light diffracted in an opposing direction and to convert the at least one beam of light diffracted in an opposing direction into electrical energy. In some examples, the at least one beam of light comprise a first beam of red light directed to a first waveguide of at least one waveguide of the illumination source component, a second beam of green light directed to a second waveguide of the at least one waveguide of the illumination source component, and a third beam of blue light directed to a third waveguide of the at least one waveguide of the illumination source component.

In some examples, the illumination source component may be a photonic integrated circuit (PIC) and the energy harvesting component may be a photovoltaic (PV) cell. In some examples, the energy harvesting component comprises a plurality of cell layers and the plurality of cell layers comprises a first cell layer to absorb the second beam of green light and the third beam of blue light and a second cell layer to absorb the first beam of red light. In some examples, the first beam of red light passes through the first cell layer and may be absorbed by the second cell layer and the first cell layer and the second cell layer are epitaxially grown as single crystalline layers. In some examples, the display device may further comprise: an interconnect layer to pass through the at least one beam of light diffracted in an opposing direction, wherein the interconnect layer comprises at least one via to enable an electrical interconnect between the illumination source component and the energy harvesting component.

In some examples, the systems and methods may include an apparatus, comprising: a light source to generate and transmit display light, the display light comprising at least one beam of light; a photonic integrated circuit (PIC) to receive the at least one beam of light, wherein the photonic integrated circuit (PIC) comprises at least one waveguide, and wherein the at least one waveguide each comprise at least one diffraction grating to diffract the at least one beam of light in a first direction and an opposing direction; an interconnect layer coupled to the photonic integrated circuit (PIC), wherein the interconnect layer may be to pass through the at least one beam of light diffracted in an opposing direction; and an energy harvesting component coupled to the interconnect layer, wherein the energy harvesting component may be to receive and absorb the at least one beam of light diffracted in an opposing direction and to convert the at least one beam of light diffracted in an opposing direction into electrical energy. In addition, the apparatus may include a liquid crystal (LC) layer to modulate the at least one beam of light diffracted in a first direction; at least one optical filter layer to filter the at least one beam of light diffracted in a first direction to provide a characteristic visual appearance for a display image, and at least one polarization filter layer to polarize the at least one beam of light diffracted in a first direction and pass the at least one beam of light diffracted in a first direction towards a glass substrate.

In some examples, the at least one beam of light comprise a first beam of red light directed to a first waveguide of the at least one waveguide, a second beam of green light directed to a second waveguide of the at least one waveguide, and a third beam of blue light directed to a third waveguide of the at least one waveguide.

In some examples, the energy harvesting component may be a photovoltaic (PV) cell and the energy harvesting component comprises a plurality of cell layers. In some examples, the plurality of cell layers comprises a first cell layer to absorb the second beam of green light and the third beam of blue light and a second cell layer to absorb the first beam of red light. In some examples, each of the plurality of cell layers are coupled mechanically via use of an optically clear adhesive (OCA). Also, in some examples, the interconnect layer comprises at least one via to enable an electrical interconnect between the photonic integrated circuit (PIC) and the energy harvesting component and the energy harvesting component comprises at least one electrode structure near or adjacent the at least one via. In some examples, the interconnect layer may be comprised of a material with a refractive index selected to transition between a refractive index of a material comprising the photonic integrated circuit (PIC) and a refractive index of a material comprising the energy harvesting component.

In some examples, the systems and methods may include a method for utilizing an energy harvesting component to convert light to electrical energy for a display device having an illumination source component, comprising: providing light to the illumination source component in the display device; diffracting the light via the illumination source component in a first direction and an opposing direction; capturing the light diffracted in the opposing direction via the energy harvesting component; converting the light that was captured to electrical energy via the energy harvesting component; and directing the electrical energy to provide power to a display component in the display device. In some examples, the energy harvesting component may be a photovoltaic (PV) cell and the display component may be a photonic integrated circuit (PIC) operating as a backlight for the display device.

FIG. 1 illustrates a block diagram of an artificial reality system environment 100 including a near-eye display device, according to an example. As used herein, a "near-eye display device" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display device."

As shown in FIG. 1, the artificial reality system environment 100 may include a near-eye display device 120, an optional external imaging device 150, and an optional input/output interface 140, each of which may be coupled to a console 110. The console 110 may be optional in some instances as the functions of the console 110 may be integrated into the near-eye display device 120. In some examples, the near-eye display device 120 may be a head-mounted display (HMD) that presents content to a user.

In some instances, for a near-eye display device, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display device, light from a surrounding environment may traverse a "see-through" region of a waveguide display (e.g., a transparent substrate) to reach a user's eyes. For example, in a near-eye display device, light of projected images may be coupled into a transparent substrate of a waveguide, propagate within the waveguide, and be coupled or directed out of the waveguide at one or more locations to replicate exit pupils and expand the eye box.

In some examples, the near-eye display device 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display device 120 may be implemented in any suitable form-factor, including a head-mounted display (HMD), a pair of glasses, or other similar wearable eyewear or device. Examples of the near-eye display device 120 are further described below with respect to FIGS. 2 and 3. Additionally, in some examples, the functionality described herein may be used in a head-mounted display (HMD) or headset that may combine images of an environment external to the near-eye display device 120 and artificial reality content (e.g., computer-generated images). Therefore, in some examples, the near-eye display device 120 may augment images of a physical, real-world environment external to the near-eye display device 120 with generated and/or overlaid digital content (e.g., images, video, sound, etc.) to present an augmented reality to a user.

In some examples, the near-eye display device 120 may include any number of display electronics 122, display optics 124, and an eye tracking unit 130. In some examples, the near-eye display device 120 may also include one or more locators 126, one or more position sensors 128, and an inertial measurement unit (IMU) 132. In some examples, the near-eye display device 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display device 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display device 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display device 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display device 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display device 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display device 120 that may be relative to an initial position of the near-eye display device 120. For example, the inertial measurement unit (IMU) 132 may integrate measurement signals received from accelerometers over time to estimate a velocity vector and integrate the velocity vector over time to determine an estimated position of a reference point on the near-eye display device 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the near-eye display device 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display device 120 for presentation to the user in accordance with information received from one or more of external imaging device 150, the near-eye display device 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display device 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display device 120 using slow calibration information from the external imaging device 150. For example, the headset tracking module 114 may determine positions of a reference point of the near-eye display device 120 using observed locators from the slow calibration information and a model of the near-eye display device 120. Additionally, in some examples, the headset tracking module 114 may use portions of the fast calibration information, the slow calibration information, or any combination thereof, to predict a future location of the near-eye display device 120. In some examples, the headset tracking module 114 may provide the estimated or predicted future position of the near-eye display device 120 to the virtual reality engine 116.

In some examples, the virtual reality engine 116 may execute applications within the artificial reality system environment 100 and receive position information of the near-eye display device 120, acceleration information of the near-eye display device 120, velocity information of the near-eye display device 120, predicted future positions of the near-eye display device 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display device 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display device 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

In some examples, a location of a projector of a display system may be adjusted to enable any number of design modifications. For example, in some instances, a projector may be located in front of a viewer's eye (e.g., "front-mounted" placement). In a front-mounted placement, in some examples, a projector of a display system may be located away from a user's eyes (e.g., "world-side"). In some examples, a head-mounted display (HMD) device may utilize a front-mounted placement to propagate light towards a user's eye(s) to project an image.

Figure 2A:
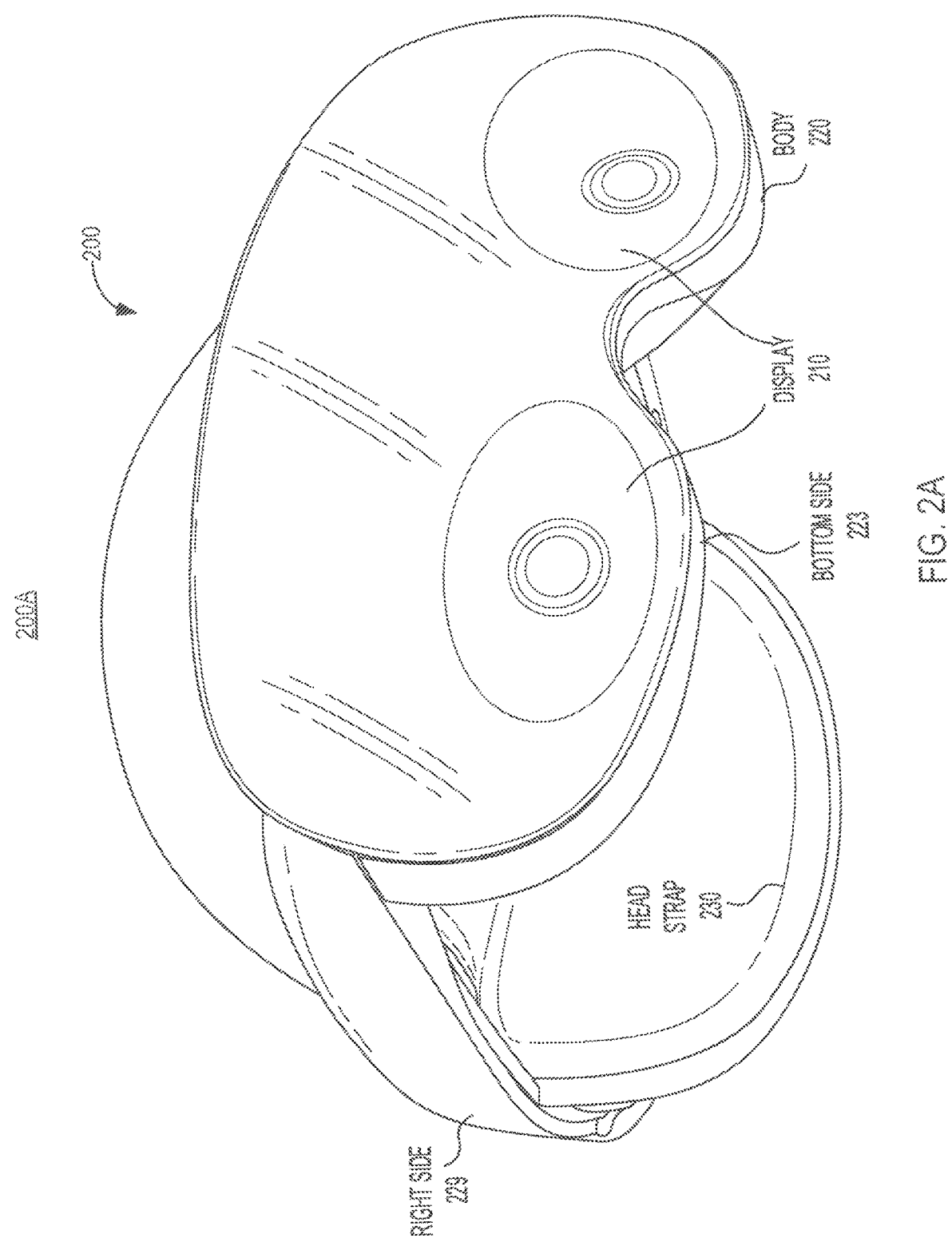
FIGS. 2A-2C illustrate various views of a near-eye display device in the form of a head-mounted display (HMD) device, according to examples.
Figure 2B:
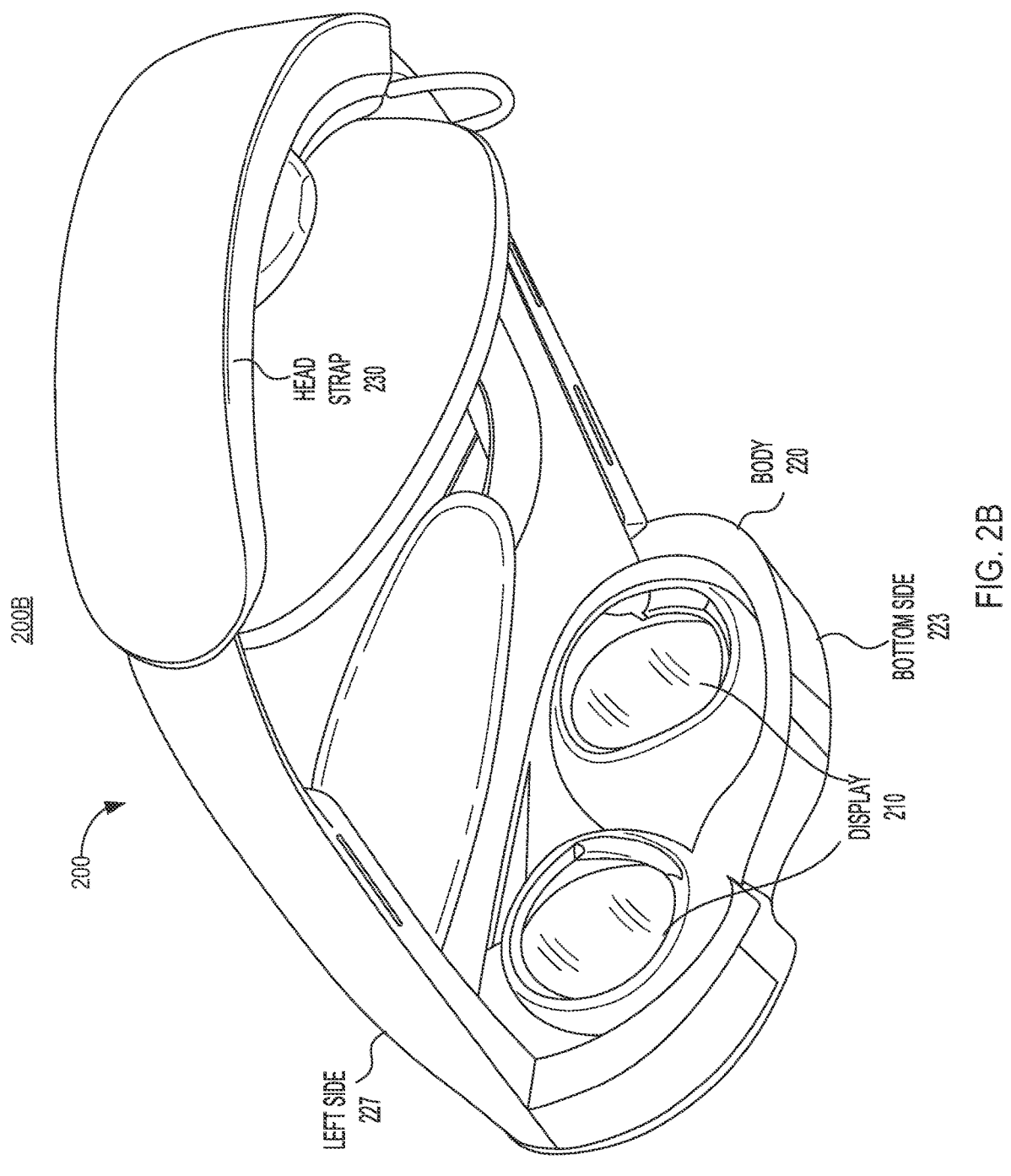
Figure 2C:
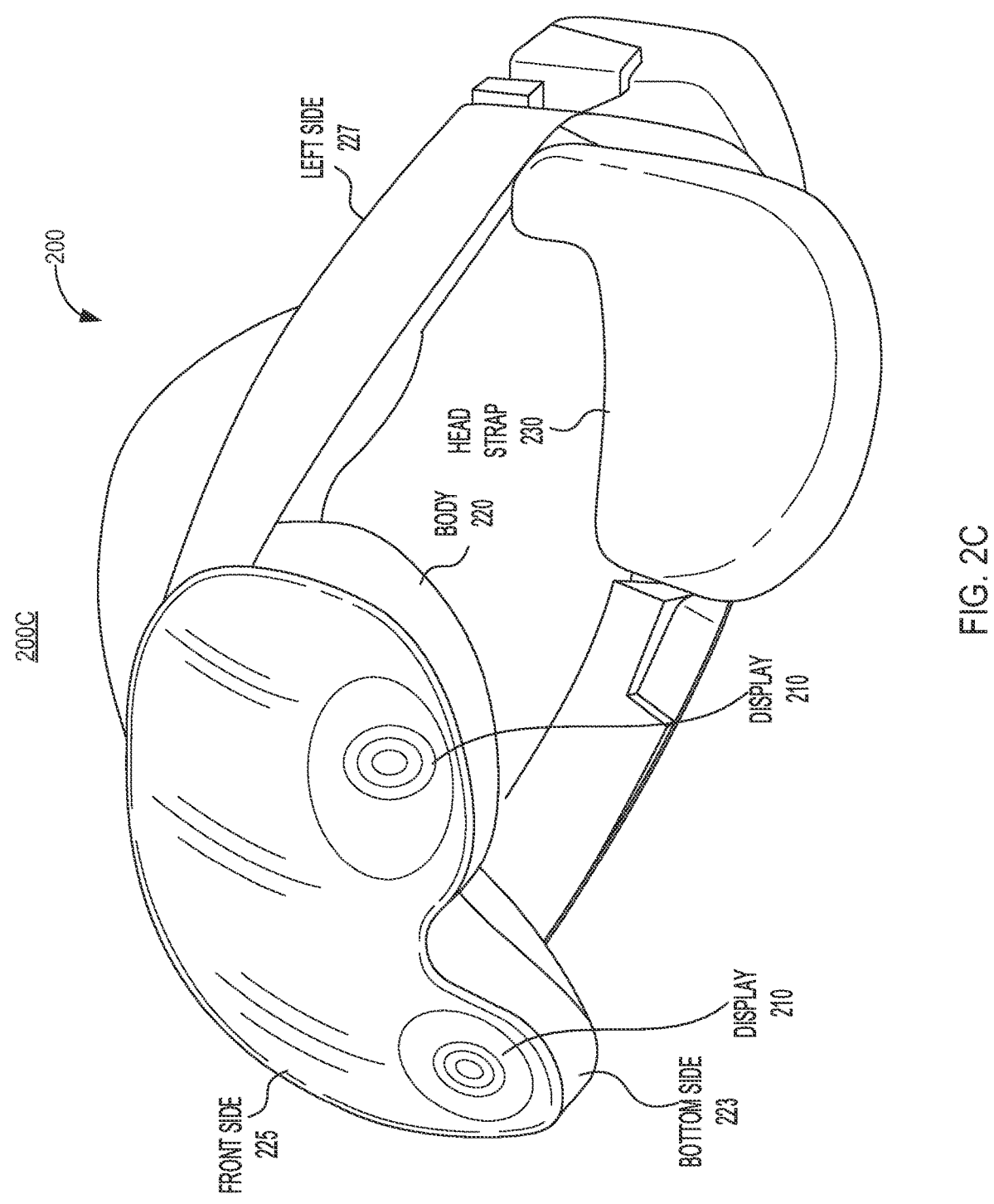

FIGS. 2A-2C illustrate various views of a near-eye display device in the form of a head-mounted display (HMD) device 200, according to examples. In some examples, the head-mounted device (HMD) device 200 may be a part of a virtual reality (VR) system, an augmented reality (AR) system, a mixed reality (MR) system, another system that uses displays or wearables, or any combination thereof. As shown in diagram 200A of FIG. 2A, the head-mounted display (HMD) device 200 may include a body 220 and a head strap 230. The front perspective view of the head-mounted display (HMD) device 200 further shows a bottom side 223, a front side 225, and a right side 229 of the body 220. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components such as a display 210 to present a wearer augmented reality (AR)/virtual reality (VR) content and a camera to capture images or videos of the wearer's environment.

As shown in the bottom perspective view of diagram 200B of FIG. 2B, the display 210 may include one or more display assemblies and present, to a user (wearer), media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the user may interact with the presented images or videos through eye tracking sensors enclosed in the body 220 of the head-mounted display (HMD) device 200. The eye tracking sensors may also be used to adjust and improve quality of the presented content.

In some examples, the head-mounted display (HMD) device 200 may include a fringe-projection profilometry (FPP) projector and the camera or the eye tracking sensors may include a dual readout sensor. The projector may transmit a frequency signal pattern and a zero-frequency signal pattern onto an object's (e.g., eye in case of eye tracking) surface. The projector may also transmit two periodic phase-shifted frequency signal patterns onto the object's surface, where the two phase-shifted frequency signal patterns may be phase-shifted by 180 degrees. The dual readout sensor may capture reflections of both transmitted patterns (frequency and zero frequency or phase-shifted frequency signal patterns), and a direct component (DC) signal may be removed through subtraction or cancellation. In both examples, the derived signal may be used to generate a wrapped phase map through Fourier transform profilometry (FTP). The resulting wrapped phase map may be unwrapped, for example, using a depth-calibrated unwrapped phase map. A three-dimensional reconstruction of the object's surface may be generated by converting phase from the unwrapped phase map to three-dimensional coordinates.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface for communicating with a console communicatively coupled to the head-mounted display (HMD) device 200 through wired or wireless means. In some examples, the head-mounted display (HMD) device 200 may include a virtual reality engine (not shown) that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine may be used for producing a signal (e.g., display instructions) to the display 210. In some examples, the head-mounted display (HMD) device 200 may include locators (not shown), which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

Figure 3:
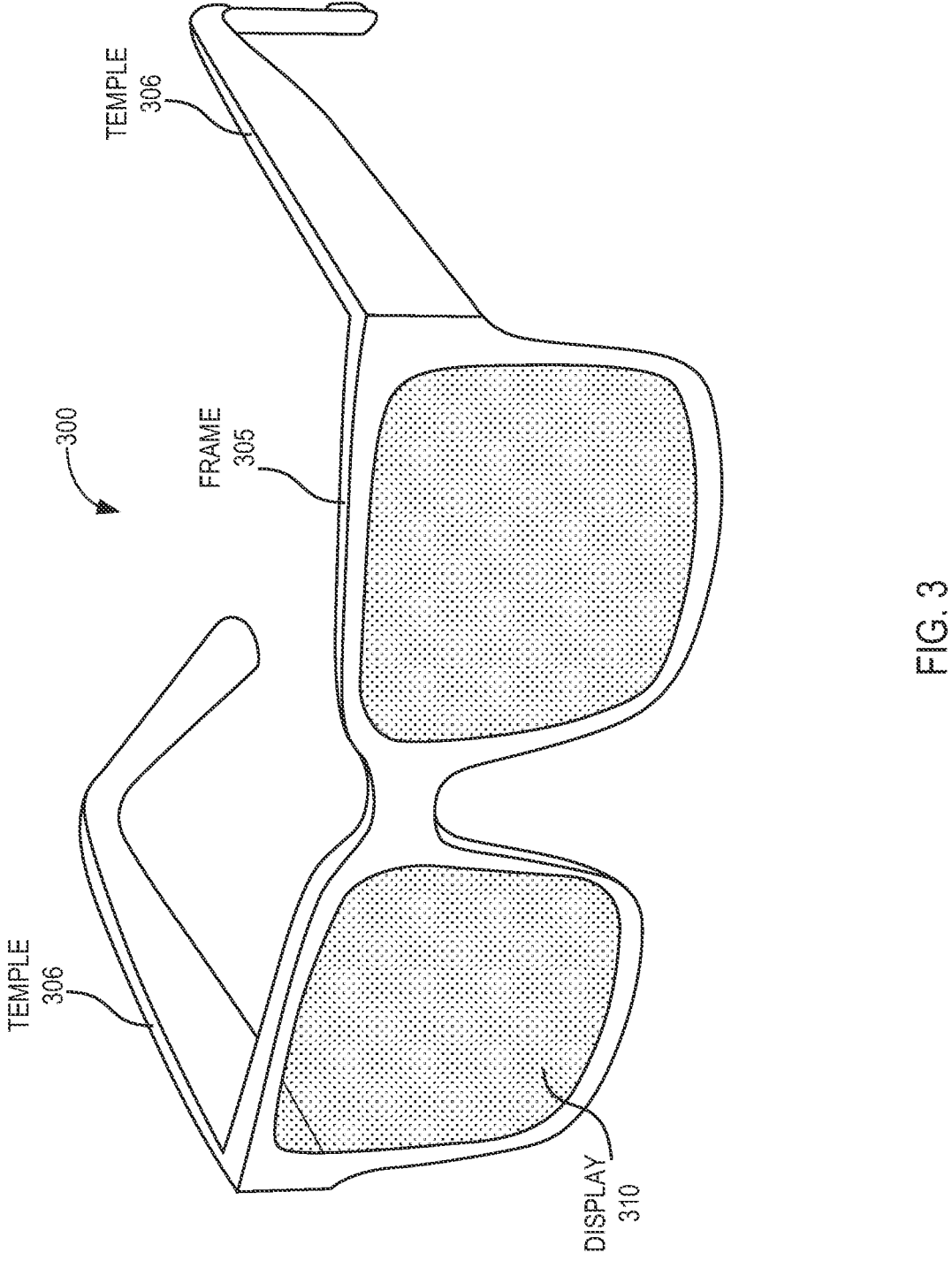
FIG. 3 illustrate a perspective view and a top view of a near-eye display device in the form of a pair of glasses, according to an example.

FIG. 3 is a perspective view of a near-eye display device 300 in the form of a pair of glasses (or other similar eyewear), according to an example. In some examples, the near-eye display device 300 may be a specific example of near-eye display device 120 of FIG. 1 and may be configured to operate as a virtual reality display, an augmented reality (AR) display, and/or a mixed reality (MR) display.

In some examples, the near-eye display device 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display device 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display device 300 may include a projector.

In some examples, the near-eye display device 300 may further include various sensors on or within a frame 305. In some examples, the various sensors may include any number of depth sensors, motion sensors, position sensors, inertial sensors, and/or ambient light sensors, as shown. In some examples, the various sensors may include any number of image sensors configured to generate image data representing different fields of views in one or more different directions. In some examples, the various sensors may be used as input devices to control or influence the displayed content of the near-eye display device, and/or to provide an interactive virtual reality (VR), augmented reality (AR), and/or mixed reality (MR) experience to a user of the near-eye display device 300. In some examples, the various sensors may also be used for stereoscopic imaging or other similar applications.

In some examples, the near-eye display device 300 may further include one or more illuminators to project light into a physical environment. The projected light may be associated with different frequency bands (e.g., visible light, infra-red light, ultra-violet light, etc.), and may serve various purposes. In some examples, the one or more illuminator(s) may be used as locators, such as the one or more locators 126 described above with respect to FIGS. 1-2.

In some examples, the near-eye display device 300 may also include a camera or other image capture unit. The camera, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display device 300 may also include an eye tracking camera.

Figure 4:
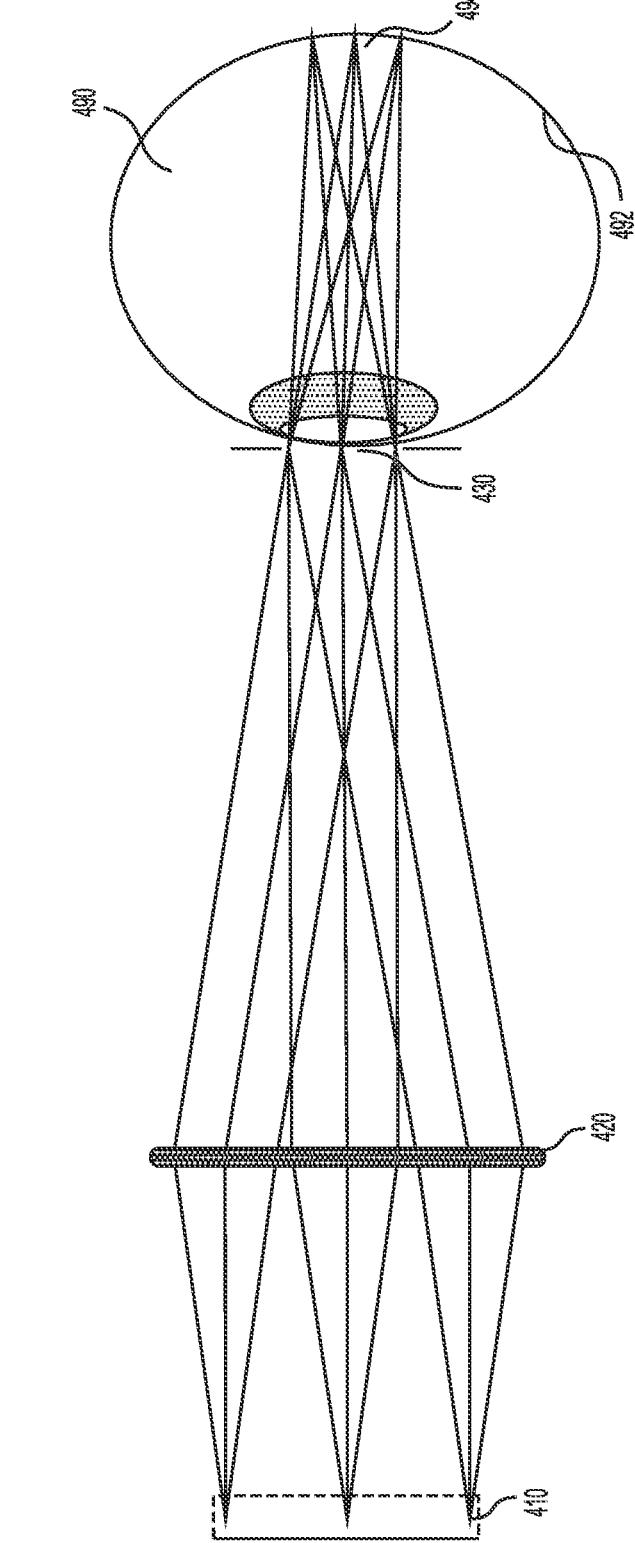
FIG. 4 illustrates a schematic diagram of an optical system in a near-eye display system, according to an example.

FIG. 4 illustrates a schematic diagram of an optical system 400 in a near-eye display system, according to an example. In some examples, the optical system 400 may include an image source 410 and any number of projector optics 420 (which may include waveguides having gratings as discussed herein). In the example shown in FIG. 4, the image source 410 may be positioned in front of the projector optics 420 and may project light toward the projector optics 420. In some examples, the image source 410 may be located outside of the field of view (FOV) of a user's eye 490. In this case, the projector optics 420 may include one or more reflectors, refractors, or directional couplers that may deflect light from the image source 410 that is outside of the field of view (FOV) of the user's eye 490 to make the image source 410 appear to be in front of the user's eye 490. Light from an area (e.g., a pixel or a light emitting device) on the image source 410 may be collimated and directed to an exit pupil 430 by the projector optics 420. Thus, objects at different spatial locations on the image source 410 may appear to be objects far away from the user's eye 490 in different viewing angles (e.g., fields of view (FOV)). The collimated light from different viewing angles may then be focused by the lens of the user's eye 490 onto different locations on retina 492 of the user's eye 490. For example, at least some portions of the light may be focused on a fovea 494 on the retina 492. Collimated light rays from an area on the image source 410 and incident on the user's eye 490 from a same direction may be focused onto a same location on the retina 492. As such, a single image of the image source 410 may be formed on the retina 492.

In some instances, a user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Also, in some examples, to create a fully immersive visual environment, a large field of view (FOV) may be desirable because a large field of view (FOV) (e.g., greater than about 60°) may provide a sense of "being in" an image, rather than merely viewing the image. In some instances, smaller fields of view may also preclude some important visual information. For example, a head-mounted display (HMD) system with a small field of view (FOV) may use a gesture interface, but users may not readily see their hands in the small field of view (FOV) to be sure that they are using the correct motions or movements. On the other hand, wider fields of view may require larger displays or optical systems, which may influence the size, weight, cost, and/or comfort of the head-mounted display (HMD) itself.

In some examples, a waveguide may be utilized to couple light into and/or out of a display system. In particular, in some examples and as described further below, light of projected images may be coupled into or out of the waveguide using any number of reflective or diffractive optical elements, such as gratings. For example, as described further below, one or more volume Bragg gratings (VBGs) may be utilized in a waveguide-based, back-mounted display system (e.g., a pair of glasses or similar eyewear).

In some examples, one or more volume Bragg gratings (VBGs) (or two portions of a same grating) may be used to diffract display light from a projector to a user's eye. Furthermore, in some examples, the one or more volume Bragg gratings (VBGs) may also help compensate for any dispersion of display light caused by each other to reduce the overall dispersion in a waveguide-based display system.

Figure 5:
FIG. 5 illustrates a diagram of a waveguide, according to an example.
Figure 5:
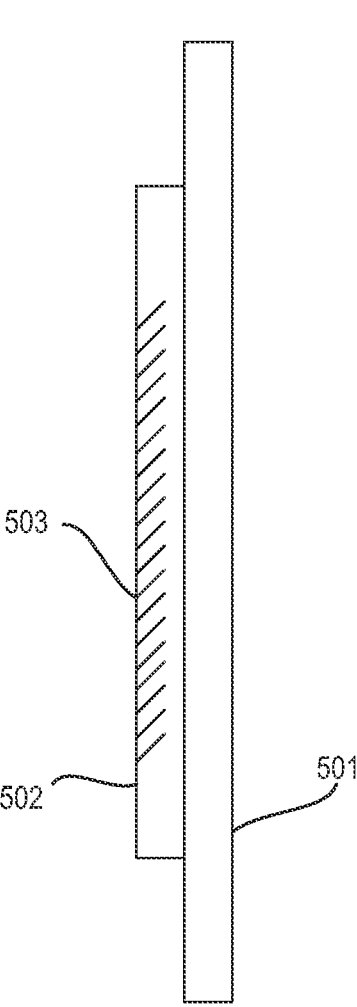

FIG. 5 illustrates a diagram of a waveguide configuration 500, according to an example. In some examples, the waveguide configuration 500 may include a plurality of layers, such as at least one substrate 501 and at least one photopolymer layer 502. In some examples, the substrate 501 may be a comprised of a polymer or glass material. In some examples, the photopolymer layer 502 may be transparent or "see-through", and may include any number of photosensitive materials (e.g., a photo-thermo-refractive glass) or other similar material.

In some examples, at least one substrate 501 and at least one photopolymer layer 502 may be optically bonded (e.g., glued on top of each other) to form the waveguide configuration 500. In some examples, the substrate 501 may have a thickness of anywhere between around 0.1-1.0 millimeters (mm) or other thickness range. In some examples, the photopolymer layer 502 may be a film layer having a thickness of anywhere between about 50-500 micrometers (μm) or other range.

In some examples, one or more volume Bragg gratings (VBGs) may be provided in (or exposed into) the photopolymer layer 502. That is, in some examples, one or more (e.g., from ten to hundreds) volume Bragg gratings may be exposed by generating an interference pattern 503 into the photopolymer layer 502. In some examples, the interference pattern 503 may be generated by superimposing two lasers to create a spatial modulation (e.g., an alteration of an existing refractive index) that may generate the interference pattern 503 in and/or throughout the photopolymer layer 502. In some examples, the interference pattern 503 may be a sinusoidal pattern. Also, in some examples, the interference pattern 503 may be made permanent via a chemical, optical, mechanical, or other similar process.

By exposing the interference pattern 503 into the photopolymer layer 502, for example, the refractive index of the photopolymer layer 502 may be altered and a volume Bragg grating may be provided in the photopolymer layer 502. Indeed, in some examples, a plurality of volume Bragg gratings or one or more sets of volume Bragg gratings may be exposed in the photopolymer layer 502. It should be appreciated that this technique may be referred to as "multiplexing." It should also be appreciated that other various techniques to provide a volume Bragg grating (VBG) in the photopolymer layer 502 may also be provided.

Figure 6:
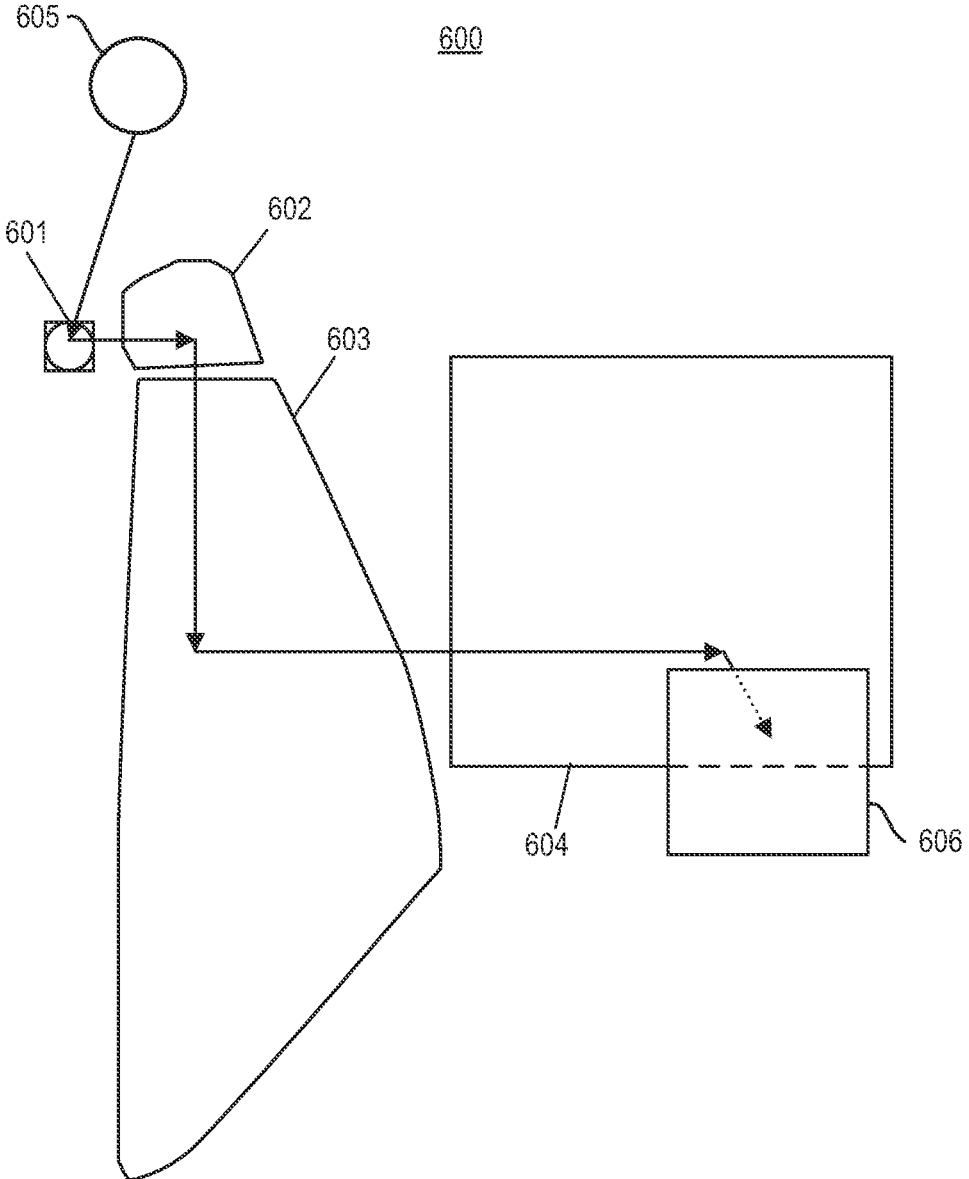
FIG. 6 illustrates a diagram of a waveguide including an arrangement of volume Bragg gratings (VBGs), according to an example.

FIG. 6 illustrates a diagram of a waveguide configuration 600 including an arrangement of volume Bragg gratings (VBGs), according to an example. In some examples, the waveguide configuration 600 may be used a display system, similar to the near-eye display system 300 of FIG. 3. The waveguide configuration 600, as shown, may include an input volume Bragg grating (VBG) 601 ("input grating" or "IG", "inbound grating", or "in-coupling grating"), a first middle volume Bragg grating (VBG) 602 ("first middle grating" or "MG1"), a second middle volume Bragg grating (VBG) 603 ("second middle grating" or "MG2"), and an output volume Bragg grating (VBG) 604 ("output grating" or "OG", "outbound grating", or "out-coupling grating"). It should be appreciated that, as used herein and in some instances, the terms "grating" and "gratings" may be used interchangeably, in that "grating" may include an arrangement of a plurality of gratings or grating structures.

In some examples, a projector 605 of the display system may transmit display light (indicated by an arrow) to the arrangement of volume Bragg gratings (VBGs) 601-604, starting with the input volume Bragg grating (VBG) 601 (which receives the display light from the projector), then through the first middle volume Bragg grating (VBG) 602 and the second middle volume Bragg grating (VBG) 603, and then to the output volume Bragg grating (VBG) 604 which directs the display light to an eyebox or a user's eye 606.

As discussed above, the waveguide configuration 600 may include any number of volume Bragg gratings (VBGs) that may be exposed into a "see-through" photopolymer material, such as glass or plastic. In some examples and as discussed above, one or more of the arrangement of volume Bragg gratings (VBGs) 601-604 may be patterned (e.g., using sinusoidal patterning) into and/or on a surface of the photopolymer material. In this way, the waveguide configuration 600 may be relatively transparent so that a user may see through to the other side. At the same time, the waveguide configuration 600, with its various arrangements of volume Bragg gratings (VBGs) 601-604 may (among other things) receive the propagated display light from the projector and exit the propagated display light in front of a user's eyes for viewing. In this way any number of augmented reality (AR) and/or mixed reality (MR) environments may be provided to and experienced by the user. In addition, in some examples, the arrangement of volume Bragg gratings (VBGs) 601-604 may be implemented to "expand" (e.g., horizontally and/or vertically) a region in space to be viewed so that a user may view a displayed image regardless of where a pupil of a user's eye may be. As such, in some examples, by expanding this viewing region, the arrangement of volume Bragg gratings (VBGs) 601-604 may ensure that a user may move their eye in various directions and still view the displayed image.

In some instances, and as described further below, examples may utilize an energy harvesting component, such as a photovoltaic (PV) cell, to capture unused light emitted by an optical component, such as a photonic integrated circuit (PIC). In addition, in some examples, the energy harvesting component may convert the light energy into electrical energy to provide power to an associated device or component (e.g., a battery).

Figure 7A:
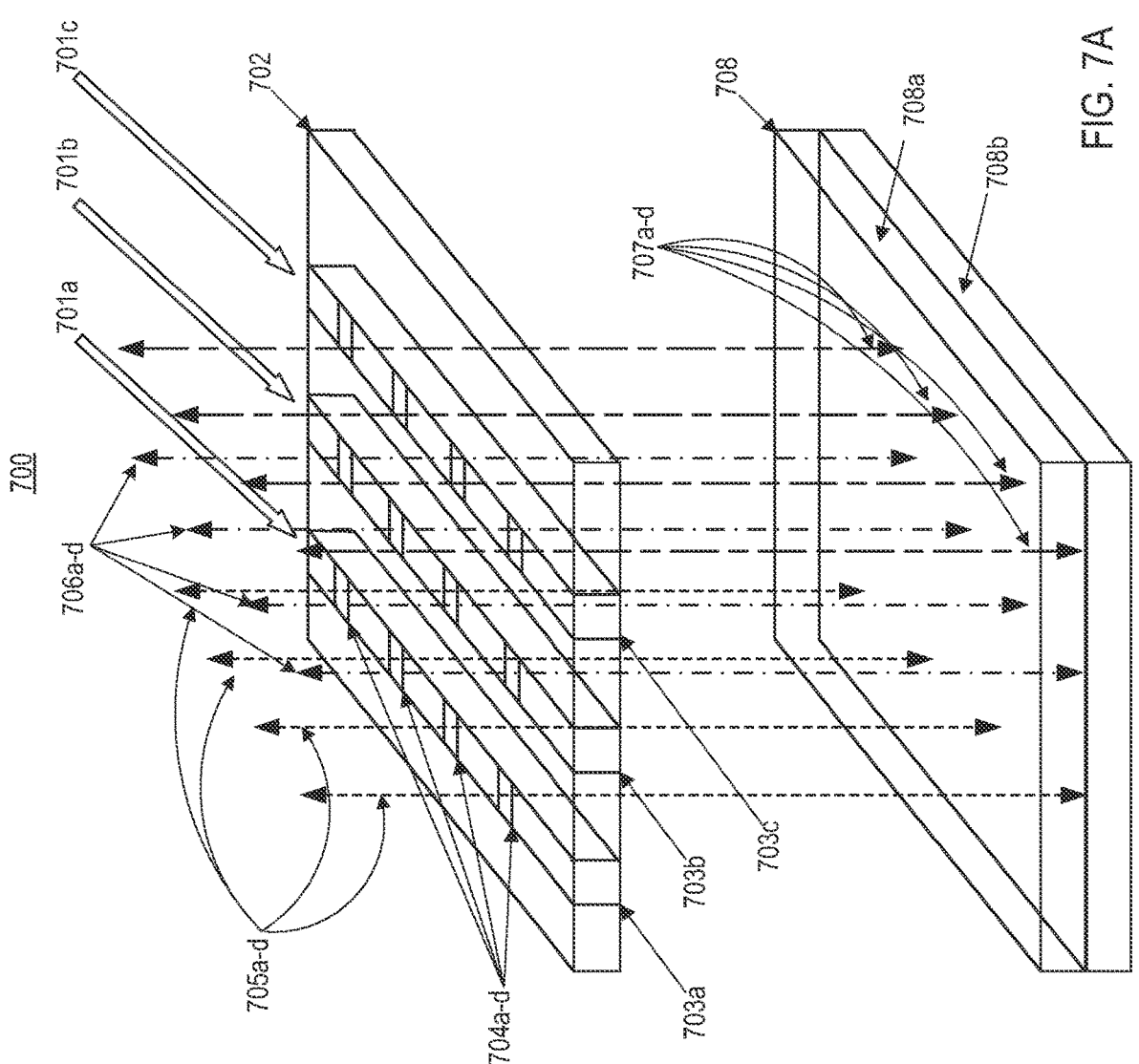
FIG. 7A illustrates an optical component having an energy harvesting component that may be utilized to harvest light, according to an example.

FIG. 7A illustrates an optical component 700 having an energy harvesting component that may be utilized to harvest light (e.g., visible light), according to an example. In some examples, the optical component 700 may be used in conjunction with the examples illustrated in FIGS. 1-6.

In some examples, the optical component 700 may include a photonic integrated circuit (PIC) 702 that may receive light beams 701a-c. In some examples, the light beams 701a-c may be emitted via one or more light sources, such as a laser (not shown). In some examples, other illumination sources, such as light emitting diodes (LEDs), laser diodes, beam shapers, and the like may be implemented as well.

In some examples, the light beams 701a-c may be associated with a wavelength range for a color in the visible light spectrum. So, for example, in some instances, the light beam 701a may be red light, the light beam 701b may be green light, and the light beam 701c may be blue light.

In some examples, the light beams 701a-c may each be directed toward an individual waveguide of the waveguides 703a-c of the photonic integrated circuit (PIC) 702. In particular, in some examples, the light beam 701a (e.g., red) may be directed to the waveguide 703a, the light beam 701b (e.g., green) may be directed to the waveguide 703b, and the light beam 701c (e.g., blue) may be directed to the waveguide 703c.

In some examples, as the light beams 701a-c may pass through the waveguides 703a-c, they may be diffracted via one or more diffraction gratings. That is, as discussed above, in some examples, a first portion of the light beams 701a-c may be diffracted in a first direction by the one or more diffraction gratings, and another portion of the light beams 701a-c may be diffracted in an opposing direction by the one or more diffraction gratings.

In the example illustrated in the FIG. 7, the diffraction grating 704a may diffract the light beam 701a (e.g., red light) to generate a diffracted light beam 705a. In some examples, the diffracted light beam 705a may travel in a first (upward) direction (e.g., towards a viewing user's eyes) and in an opposing direction (e.g., towards an energy harvesting component).

Also, in some examples, the diffracted light beam 705b may be diffracted by the diffraction grating 704b, and may travel in a first (upward) direction (e.g., towards a viewing user's eyes) and in an opposing direction (e.g., towards a photovoltaic (PV) cell 708). Also, in some examples, the diffracted light beam 705c may be diffracted by the diffraction grating 704c, and may travel in a first (upward) direction (e.g., towards a viewing user's eyes) and in an opposing direction (e.g., towards a photovoltaic (PV) cell 708), and in some examples, the diffracted light beam 705d may be diffracted by the diffraction grating 704d, and may travel in a first (upward) direction (e.g., towards a viewing user's eyes) and in an opposing direction (e.g., towards a photovoltaic (PV) cell 708).

Similarly, the light beam 701b (e.g., green light) may enter the waveguide 703b and pass through the diffraction gratings of the waveguide 703b to generate diffracted light beams 706a-d. In some examples, the diffracted light beams 706a-d may travel in a first (upward) direction (e.g., towards a viewing user's eyes) and in an opposing direction (e.g., towards a photovoltaic (PV) cell 708).

Also, the light beam 701c (e.g., blue light) may enter the waveguide 703c pass through the diffraction gratings of the waveguide 703c to generate diffracted light beams 707a-d. In some examples, the diffracted light beams 707a-d may travel in a first (upward) direction (e.g., towards a viewing user's eyes) and in an opposing direction (e.g., towards a photovoltaic (PV) cell 708).

In some examples, an energy harvesting component may be a photovoltaic (PV) cell 708. In some examples and as discussed above, the photovoltaic (PV) cell 708 may be an electrical device that may convert optical energy into electrical energy. In particular, in some examples, the photovoltaic (PV) cell 708 may be receive and absorb light (e.g., emitted from laser and diffracted by a photonic integrated circuit (PIC)), and to convert the received light into electrical energy.

In some examples, the photovoltaic (PV) cell 708 may absorb light of various and/or predetermined wavelength ranges. In particular, in some examples, the photovoltaic (PV) cell 708 may absorb light associated with the red, green, and blue (RGB) portion of the visible light spectrum.

In some examples, the photovoltaic (PV) cell 708 may include one or more cell layers 708a-b. In some examples, each the one or more cell layers 708a-b may absorb a particular wavelength range.

In some examples, the wavelength ranges for each of the one or more cell layers 708a-b may be predetermined, and may be specified to provide maximum absorption of the light received by the photovoltaic (PV) cell 708. Indeed, it may be appreciated that, in some instances, while a single cell layer may absorb a first wavelength range efficiently, the same cell layer may not absorb a second wavelength range as efficiently. Accordingly, it may further be appreciated that the one or more cell layers of a photovoltaic (PV) cell (e.g., the photovoltaic (PV) cell 708) may be provided to maximize energy conversion efficiency of the photovoltaic (PV) cell.

So, in the example illustrated in FIG. 7A, a first cell layer 708a may be directed to absorption of a higher-energy (or shorter wavelength) range of the optical spectrum, and therefore may absorb green and blue light. Additionally, a second cell layer 708b may be directed to absorption of a lower-energy (or longer wavelength) range of the optical spectrum, and therefore may absorb red light. In particular, the red light to be absorbed by the second cell layer 708b may, in some examples, first pass through the first cell layer 708a and then be absorbed by the second cell layer 708b.

It may be appreciated that the photovoltaic (PV) cell 708 may include any number of cell layers, wherein each cell layer may absorb a particular wavelength range (e.g., for light emitted from a light source and received by a photonic integrated circuit (PIC)). However, it may also be appreciated that with each additional cell layer that may be added, a corresponding increase in resistance may lead to an increase in unwanted heat, which may lead to less electrical energy provided by the photovoltaic (PV) cell.

In some examples, a thickness of each of the one or more cell layers 708a-b may be provided according to a wavelength range of light to be absorbed. Specifically, in some examples, a cell layer of the one or more cell layers 708a-b that may be directed to a higher-energy (or shorter wavelength) range of the optical spectrum may be relatively thinner, whereas a cell layer of the one or more cell layer 708a-b that may be directed to a lower-energy (or longer wavelength) range of the optical spectrum may be relatively thicker.

Moreover, in some examples, the thickness of each of the one or more cell layers 708a-b may also be selected (and grown) to provide an output current that may be same. That is, in the case of a photovoltaic (PV) cell that may be providing electrical energy, it may be beneficial for the one or more cell layers 708a-b to direct the provided electrical energy in a uniform manner.

In some examples, upon absorbing a wavelength range of light and converting to electrical energy, the one or more cell layers 708a-b may transmit the converted electrical energy via one or more output conductors. Specifically, in some examples, each of the one or more cell layers 708a-b may include one or more output conductors to transfer the electrical energy to a destination component. In some examples, the output conductors may transmit the converted electrical energy to an associated optical device or component (e.g., a photonic integrated circuit (PIC) associated with a backlight of a display device). In other examples, the one or more output conductors may provide the converted electrical energy to a battery.

In some examples, the one or more output conductors for the one or more cell layers may be coupled in series, while in other examples, the one or more output conductors for the one or more cell layers may be coupled in parallel. It may be appreciated that when coupling the one or more output conductors for the one or more cell layers in series, it may not be necessary to provide a voltage drop across the one or more cell layers to be same. However, when coupling the one or more output conductors for the one or more cell layers in parallel, it may be necessary to provide a voltage drop across the one or more cell layers to be same.

In some examples, the one or more cell layers 708a-b of the photovoltaic (PV) cell 708 may be epitaxially grown. As used herein, "epitaxial growth" may include any process for material deposition in which layers are formed with one or more defined orientations with respect to a seed layer. In some examples, the one or more cell layers 708a-b may be grown on top of a substrate (e.g., a semiconductor wafer substrate), wherein the one or more cell layers 708a-b may be grown sequentially according to an atomic structure template.

In some examples, a first cell layer of one or more cell layers directed to absorption of a shortest wavelength range (e.g., blue) may be grown on top of a second cell layer of the one or more cell layers directed to absorption of longer wavelength range (e.g., green), which may then be grown on top of a third cell layer of the one or more cell layers directed to absorption of the longest wavelength range (e.g., red). In some examples, the one or more cell layers 708a-b may be grown as single crystalline layers, while in other examples, the one or more cell layers 708a-b may be grown as poly-crystalline layers.

In some examples, the one or more cell layers 708a-b may be layered mechanically, wherein each of the one or more cell layers may be located (e.g., stacked) on top of each other and (then) coupled together. In some examples, the coupling may be achieved by an adhesive (e.g., an optically clear adhesive (OCA)) or an epoxy, wherein a refractive index matching process may be utilized to ensure minimal variation and a uniform transition between cells layers and associated adhesive layers.

Figure 7B:
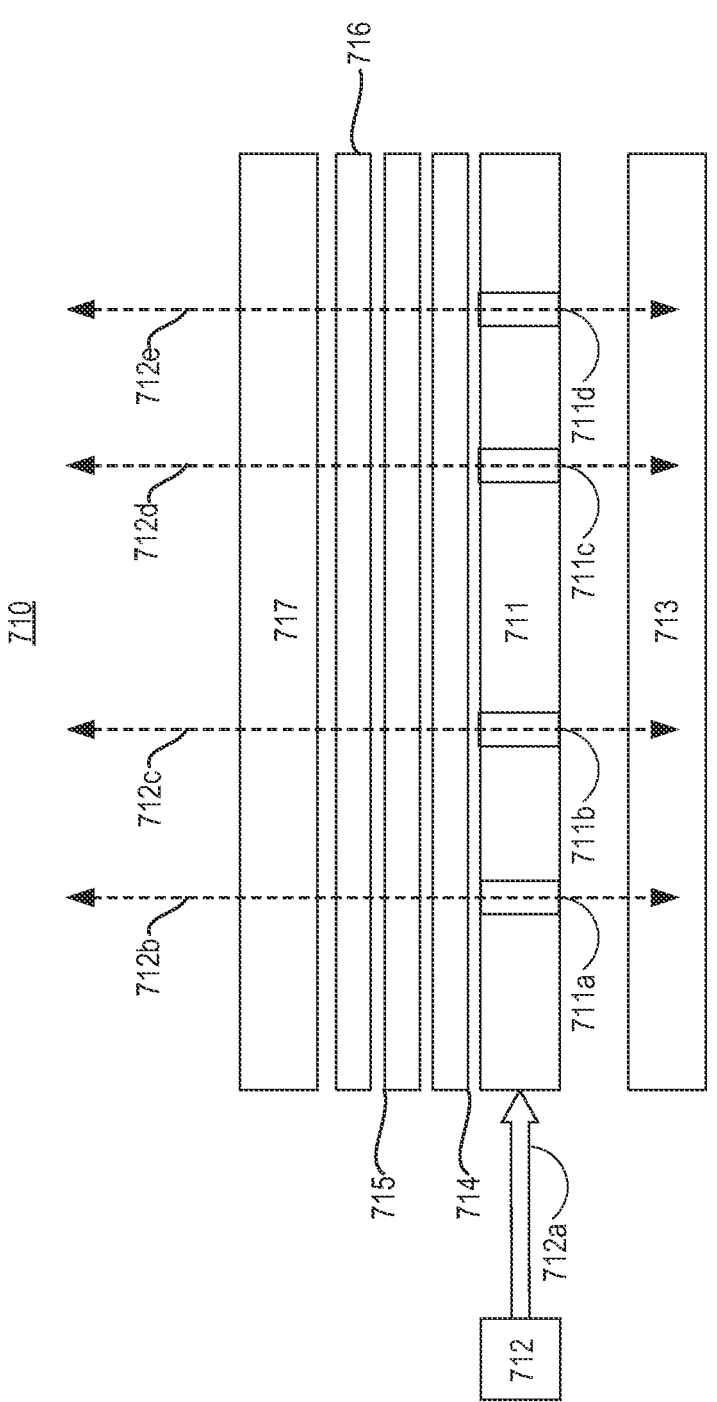
FIG. 7B illustrates a display device having an energy harvesting component and an illumination source component, according to an example.

FIG. 7B illustrates a display device 710 having an energy harvesting component and an illumination source component, according to an example. In some examples, the display device 710 may be a liquid crystal display (LCD), the illumination source component may be a photonic integrated circuit (PIC) 711, and the energy harvesting component may be a photovoltaic (PV) cell 713. In some examples, and as described further below, the photonic integrated circuit (PIC) 711 may act as a laser-based backlight display unit in conjunction with liquid crystal display (LCD) or a liquid crystal on silicon (LCoS) display.

In some examples, a photonic integrated circuit (PIC) 711 having one or more diffraction gratings 711*a-d* may receive a light beam 712*a* (e.g. similar to the light beams 701*a-c* in FIG. 7A) emitted via a light source 712, such as a laser diode. In some examples, the one or more diffraction gratings 711*a-d* may diffract the light beam 712*a* from the light source 712 to generate diffracted light beams 712*b-e*.

In some examples, the diffracted light beams 712*b-e* may travel in a first (upward) direction (e.g., towards a viewing user's eyes) and in an opposing direction (e.g., "world-side"). In some examples, the diffracted light beams 712*b-e* traveling in a first direction may travel from the photonic integrated circuit (PIC) 711 toward and through a liquid crystal (LC) layer 714, one or more optical filter layers 715, one or more polarization filter layers 716, and a glass substrate 717 towards the viewing user's eyes.

In some examples, the liquid crystal (LC) layer 714 may include liquid crystals to modulate the diffracted light beams 712*b-e*. In some examples, the one or more optical filter layers 715 may be used to provide a characteristic visual appearance for a display image. In some examples, the one or more polarization filter layers 716 may be used to polarize the diffracted light beams travelling in the first direction towards a viewing user's eyes.

Also, in some examples, the diffracted light beams 712*b-e* traveling in an opposing direction may travel toward a photovoltaic (PV) cell 713. In some examples, the photovoltaic (PV) cell 713 may be located world-side (e.g., away from a viewing user's eyes).

Figure 8A:
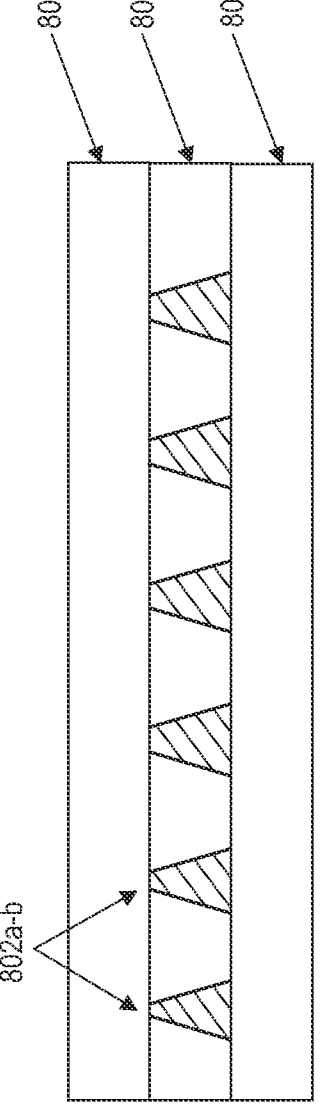
FIG. 8A illustrates an optical component having an interconnect layer that couples a photonic integrated circuit (PIC) and a photovoltaic (PV) cell, according to an example.

In some examples, an interconnect layer may be located in between a photonic integrated circuit (PIC) (e.g., the photonic integrated circuit 702) and a photovoltaic (PV) cell (e.g., the photovoltaic (PV) cell 708). FIG. 8A illustrates an optical component 800 having an interconnect layer 802 that couples a photonic integrated circuit (PIC) 801 and a photovoltaic (PV) cell 803, according to an example.

In some examples, the interconnect layer 802 may pass light emitted from the photonic integrated circuit (PIC) 801 (e.g., in an opposing direction) towards the photovoltaic (PV) cell 803. In some examples, the photovoltaic (PV) cell 803 may absorb the light passed through the interconnect layer 802, and may convert the absorbed light into electrical energy.

In some examples, the photonic integrated circuit (PIC) 801 may be "active," wherein the photonic integrated circuit (PIC) 801 may be capable of integrating active optical components and/or devices. Examples of these optical components may include lasers, modulators, PIN detectors, and optical amplifiers. As a result, the active photonic integrated circuit (PIC) 801 may also be referred to as a "photoelectric" photonic integrated circuit.

In some examples, to facilitate operation of an (e.g., active) photonic integrated circuit (PIC) 801, one or more vias 802*a-b* may be provided in the interconnect layer 802. In some examples, the one or more vias 802*a-b* may enable an electrical interconnect between the photonic integrated circuit (PIC) 801 and the photovoltaic (PV) cell 803. In some examples, the one or more vias 802*a-b* may function as "wires" to electrically couple the photonic integrated circuit (PIC) 801 and the photovoltaic (PV) cell 803.

In some examples, the one or more vias 802*a-b* may be made of an electrically conductive material (e.g., copper). In some examples, and may be able to electrically connect the photonic integrated circuit (PIC) 801 and the photovoltaic (PV) cell 803, and may pass electrical (e.g., communication) signals in between. As a result, in some examples, the interconnect layer 802 may pass optical energy and/or electrical energy.

In some examples, the one or more vias 802*a-b* may couple with one or more electrodes of the photonic integrated circuit (PIC) 801. As a result, in some examples, the one or more vias 802*a-b* may be utilized for powering a laser working in conjunction with the photonic integrated circuit (PIC) 801). Accordingly, it may be appreciated that, in some instances, it may be efficient to utilize the one or more vias 802*a-b*, as they may provide backplane (electrical) coupling without require a separate, dedicated electrical coupling for the photonic integrated circuit (PIC) 801.

In the example illustrated in FIG. 8A, the one or more vias 802*a-b* may have a trapezoidal shape. However, it may be appreciated that the one or more vias 802*a-b* may have any shape that may be conducive to providing an electrical interconnect between the photonic integrated circuit 801 and the photovoltaic (PV) cell 803. Examples of other shapes that may be implemented may include rectangular, square, and oval shapes.

In some examples, the interconnect layer 802 may be made of a material selected with respect a material comprised in the photonic integrated circuit (PIC) 801 and/or a material comprised in the photovoltaic (PV) cell 803. Examples of the materials comprising the photonic integrated circuit (PIC) may include silicon (Si), silicon dioxide (SiO2), gallium arsenide (GaAs), indium phosphide (InP), etc. Examples of the materials comprising the photovoltaic (PV) cell may include silicon (Si) and gallium arsenide (GaAs). So, in some examples, the interconnect layer 802 may be comprised of a material selected to enable an efficient optical coupling between the photonic integrated circuit (PIC) 801 and the photovoltaic (PV) cell 803.

In particular, in some examples, a material comprising the interconnect layer 802 may be selected to have a graded refractive index that may efficiently "transition" between a refractive index of a material of the photonic integrated circuit (PIC) 801 and a refractive index of the photovoltaic (PV) cell 803. As a result, by selecting a material for the interconnect layer 802 that may enable an efficient transitioning, a (back) reflection resulting from light refracting in an undesired manner (during transition) may be avoided.

Figure 8B:
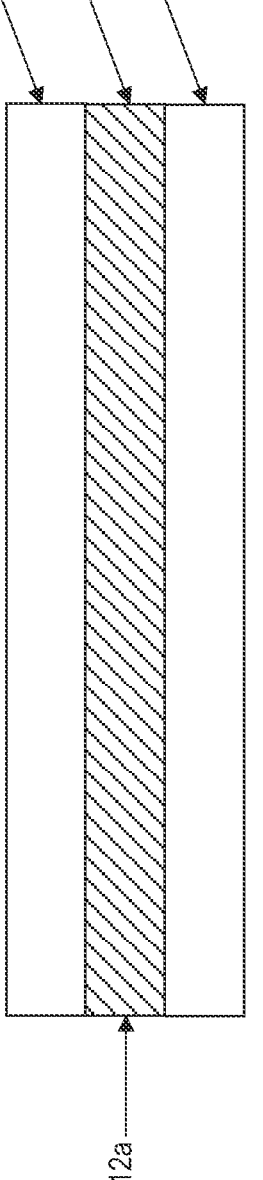
FIG. 8B illustrates an optical component having an interconnect layer that couples a photonic integrated circuit (PIC) and a photovoltaic (PV) cell, according to an example.

FIG. 8B illustrates an optical component 810 having an interconnect layer 812 that couples a photonic integrated circuit (PIC) 811 and a photovoltaic (PV) cell 813, according to an example. In some examples, the interconnect layer 812 may pass light emitted from the photonic integrated circuit (PIC) 811 (e.g., from an opposing direction) towards the photovoltaic (PV) cell 813, so that the photovoltaic (PV) cell 813 may absorb the light and convert the absorbed light into electrical energy.

In some examples, the photonic integrated circuit (PIC) 811 may be "passive," wherein the photonic integrated circuit (PIC) 811 may not include an active optical component, and may merely "pass through" optical signals. Accordingly, in some instances, the passive photonic integrated circuit (PIC) 811 may also be referred to as a "all optical" photonic integrated circuit.

In instances where the photonic integrated circuit (PIC) 811 may be passive, the interconnect layer 812 may operate as a waveguide to receive light (e.g., red, green, blue light) emitted from the photonic integrated circuit (PIC) 811 (e.g., in an opposing direction). In these instances, the interconnect layer 812 may operate as a waveguide to "pass through" the received light to the photovoltaic (PV) cell 813.

In some examples and as discussed above, the interconnect layer 812 may be made of a material selected with respect a material comprised in the photonic integrated circuit (PIC) 811 and/or a material comprised in the photovoltaic (PV) cell 813. So, in some examples, a material comprising the interconnect layer 812 may be selected to have a graded refractive index that may efficiently "transition" between a refractive index of a material of the photonic integrated circuit (PIC) 811 and a refractive index of the photovoltaic (PV) cell 813, thereby enabling an efficient optical coupling of the photonic integrated circuit (PIC) 811 and the photovoltaic (PV) cell 813.

In some instances, it may be appreciated that by absorbing optical energy passed from a first component (e.g., a photonic integrated circuit (PIC), a photovoltaic (PV) cell may develop localized regions of high(er) resistance. That is, in some examples, localized regions of resistance may develop adjacent to one or more holes create for one or more vias (e.g., the one or more vias 802*a-b* in FIG. 8) where light may pass from the first component to the photovoltaic (PV) cells.

Figure 9A:
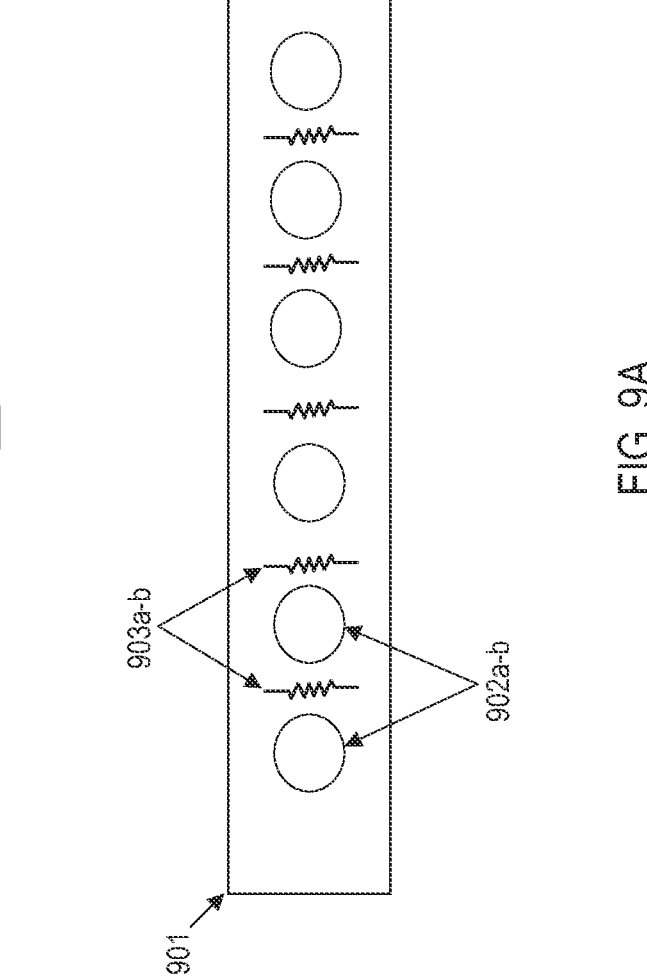
FIG. 9A illustrates a photovoltaic (PV) cell with localized regions of resistance.

FIG. 9A illustrates a top (plan) view of a photovoltaic (PV) cell 901 having localized regions of resistance, according to an example. In particular, in some instances, localized areas of resistance 903*a-b* may develop adjacent to one or more areas of absorption 902*a-b* (e.g., where holes of one or more vias may reside).

Figure 9B:
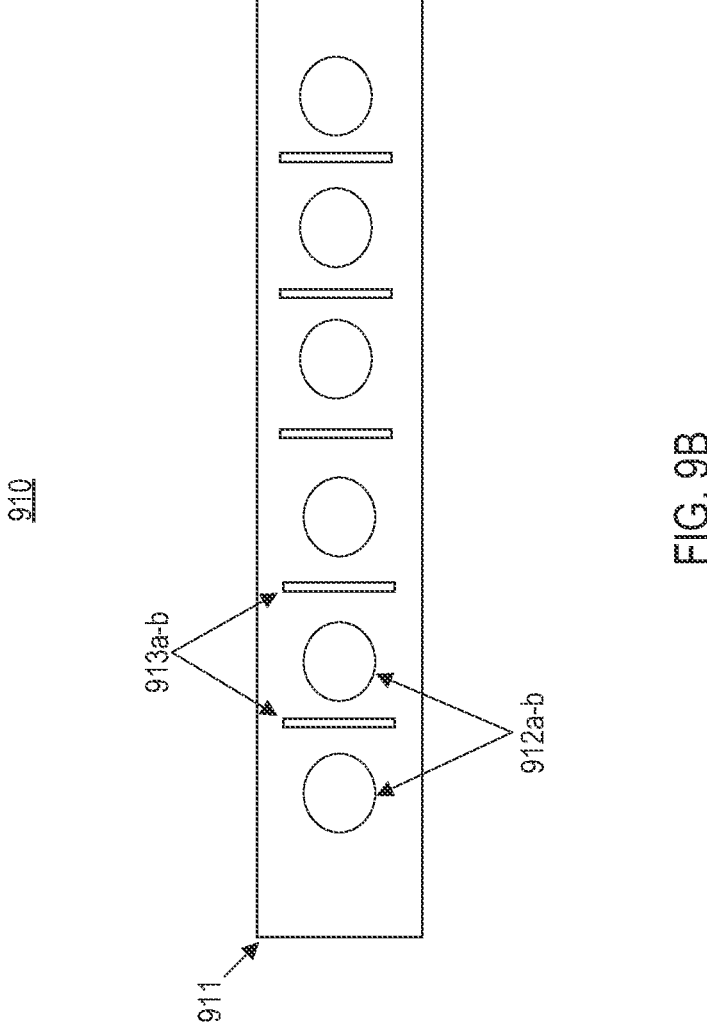
FIG. 9B illustrates a photovoltaic (PV) cell having one or more electrode structures, according to an example.

FIG. 9B illustrates a top (plan) view of a photovoltaic (PV) cell 911 having one or more electrode structures 913*a-b* adjacent to one or more areas of absorption 912*a-b*, according to an example. In some examples, the one or more electrode structures 913*a-b*, made of a conductive material, may be added near or adjacent to a localized region of resistance to ensure a more uniform spreading of current across a surface of the photovoltaic (PV) cell 911.

In some examples, the conductive material may be a metal (e.g., gold (Au), copper (Cu), aluminum (Al), indium tin oxide (ITO), etc.). In some examples, the conductive material may take a form of "traces" that may be added in between one or more holes created for the one or more vias. So, in the example, illustrated in FIG. 9B, the one or more electrode structures 913*a-b* may be traces located adjacent to and in between the holes comprising one or more areas of absorption 912*a-b*.

In some examples, the one or more electrode structures 913*a-b* may decrease resistance that may form at or near the one or more areas of absorption 912*a-b*, and may ensure a more uniform spreading of current across a surface of the photovoltaic (PV) cell 911. It may be appreciated that an electrode structure as described herein may not necessarily take a shape of a trace (as shown), but instead may take any shape or pattern that may be conducive to efficiently controlling a spread of current. Examples of additional shapes or patterns that may be implemented may include hourglass, oval, etc.

Figure 10:
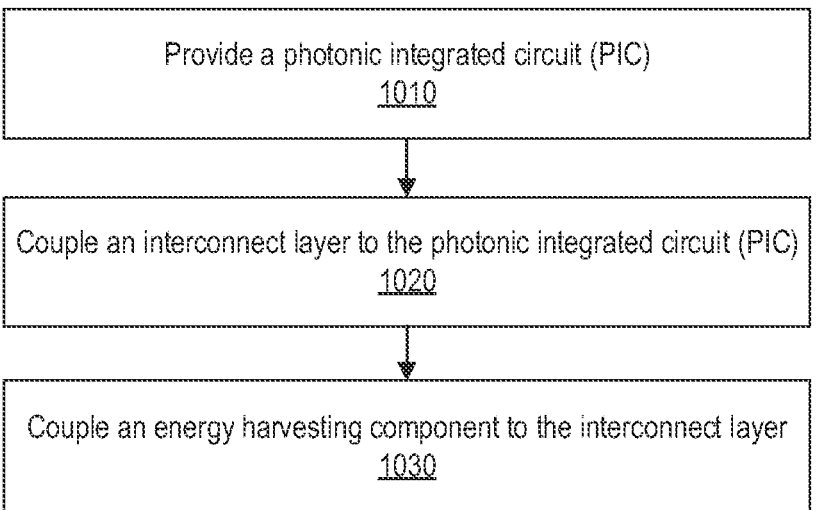
FIG. 10 illustrates a method for utilizing an energy harvesting component to convert light to electrical energy for a display device having an illumination source component, according to an example.

FIG. 10 illustrates a method for utilizing an energy harvesting component to convert light to electrical energy for a display device having an illumination source component, according to an example. The method 1000 is provided by way of example, as there may be a variety of ways to carry out the method described herein. Each block shown in FIG. 10 may further represent one or more processes, methods, or subroutines, and one or more of the blocks may include machine-readable instructions stored on a non-transitory computer-readable medium and executed by a processor or other type of processing circuit to perform one or more operations described herein. In some examples, the method 1000 may be executed or otherwise performed by other systems, or a combination of systems.

Reference is now made with respect to FIG. 10. At 1010, the method may include providing light to an illumination source component in a display device. In some examples, the light may be provided by a laser diode and the illumination source component may be a photonic integrated circuit (PIC).

At 1020, the method may include diffracting the light in a first direction and an opposing direction. In some examples, the illumination source component (e.g., a photonic integrated circuit (PIC)) may include one or more diffraction gratings to diffract the light.

At 1030, the method may include capturing the light diffracted light in the opposing direction. In some examples, the light may be captured via an energy harvesting component that may receive and absorb the light diffracted in an opposing direction. In some examples, the energy harvesting component may be a photovoltaic (PV) cell.

At 1040, the method may include converting the light that is captured into electrical energy.

At 1050, the method may include directing the electrical energy to provide power to a component in the display device. In some examples, the component in the display device may be a photonic integrated circuit (PIC).

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An apparatus, comprising:

a light source to generate and transmit display light, the display light comprising at least one beam of light;

a photonic integrated circuit (PIC) to receive the at least one beam of light, wherein the photonic integrated circuit (PIC) comprises at least one waveguide, and wherein the at least one waveguide each comprise at least one diffraction grating to diffract the at least one beam of light in a first direction and an opposing direction;

an interconnect layer coupled to the photonic integrated circuit (PIC), wherein the interconnect layer is to pass through the at least one beam of light diffracted in the opposing direction;

an energy harvesting component coupled to the interconnect layer, wherein the energy harvesting component is to receive and absorb the at least one beam of light diffracted in the opposing direction and to convert the at least one beam of light diffracted in the opposing direction into electrical energy;

a liquid crystal (LC) layer to modulate the at least one beam of light diffracted in a first direction;

at least one optical filter layer to filter the at least one beam of light diffracted in a first direction to provide a characteristic visual appearance for a display image; and at least one polarization filter layer to polarize the at least one beam of light diffracted in a first direction and pass the at least one beam of light 20 diffracted in a first direction towards a glass substrate.

2. The apparatus of claim 1, wherein the at least one beam of light comprises a first beam of red light directed to a first waveguide of the at least one waveguide, a second beam of green light directed to a second waveguide of the at least one waveguide, and a third beam of blue light directed to a third waveguide of the at least one waveguide.

3. The apparatus of claim 2, wherein the energy harvesting component is a photovoltaic (PV) cell.

4. The apparatus of claim 3, wherein the energy harvesting component comprises a plurality of cell layers.

5. The apparatus of claim 4, wherein the plurality of cell layers comprises a first cell layer to absorb the second beam of green light and the third beam of blue light and a second cell layer to absorb the first beam of red light.

6. The apparatus of claim 5, wherein each of the plurality of cell layers are coupled mechanically via use of an optically clear adhesive (OCA).

7. The apparatus of claim 6, wherein the interconnect layer comprises at least one via to enable an electrical interconnect between the photonic integrated circuit (PIC) and the energy harvesting component.

8. The apparatus of claim 7, wherein the energy harvesting component comprises at least one electrode structure near or adjacent the at least one via.

9. The apparatus of claim 1, wherein the interconnect layer is comprised of a material with a refractive index selected to transition between a refractive index of a material comprising the photonic integrated circuit (PIC) and a refractive index of a material comprising the energy harvesting component.

* * * * *